United States Patent
Alzner et al.

(10) Patent No.: US 7,348,588 B2
(45) Date of Patent: Mar. 25, 2008

(54) APPARATUS AND PROCESS FOR RETRIEVING INFORMATION PROJECTED IMAGE-WISE ON A REUSABLE STORAGE FILM AND ERASING AND RESTORING THE STORAGE FILM FOR SUBSEQUENT REUSE

(75) Inventors: Edgar Alzner, Garden City, NY (US); Walter Gross, Massapequa, NY (US)

(73) Assignee: Air Techniques, Inc., Melville, NY (US)

( * ) Notice: Subject to any disclaimer, the term of this patent is extended or adjusted under 35 U.S.C. 154(b) by 0 days.

(21) Appl. No.: 11/545,616

(22) Filed: Oct. 10, 2006

(65) Prior Publication Data

US 2007/0085046 A1 Apr. 19, 2007

Related U.S. Application Data

(60) Provisional application No. 60/725,984, filed on Oct. 13, 2005.

(51) Int. Cl.
*G03B 42/08* (2006.01)
(52) U.S. Cl. .............. 250/589; 250/580; 250/581; 250/582; 250/584; 250/588; 378/181
(58) Field of Classification Search ............ None
See application file for complete search history.

(56) References Cited

U.S. PATENT DOCUMENTS

| | | | | |
|---|---|---|---|---|
| 4,816,923 A * | 3/1989 | Saotome | ............ | 358/489 |
| 4,849,630 A * | 7/1989 | Fukai et al. | ............ | 250/588 |
| 5,180,915 A * | 1/1993 | Ohgoda | ............ | 250/585 |
| 6,255,667 B1 * | 7/2001 | Rantanen | ............ | 250/585 |
| 6,528,812 B1 * | 3/2003 | Leblans et al. | ............ | 250/588 |
| 6,599,014 B2 * | 7/2003 | Thoms | ............ | 378/184 |
| 6,773,160 B2 * | 8/2004 | Evans et al. | ............ | 378/173 |
| 7,087,917 B2 * | 8/2006 | Rosenstock et al. | ............ | 250/584 |
| 2005/0029475 A1 * | 2/2005 | Katz | ............ | 250/589 |

OTHER PUBLICATIONS

Website retrieved Jun. 28, 2007: http://ric.uthscsa.edu/personalpages/lancaste/DI-II_Chapters/DI_chap2.pdf Physics of Medical X-Ray Imaging, Feb. 2006.*

* cited by examiner

*Primary Examiner*—David Porta
*Assistant Examiner*—Yara B Green
(74) *Attorney, Agent, or Firm*—Clifford G. Frayne; Louis E. Marn

(57) ABSTRACT

These and other objects of the present invention are achieved by an apparatus and process for evaluating an image-wise exposed storage film positioned about a cylindrically-shaped member and linearly passed a cylindrically-shaped slot for interrogation by a light beam wherein a processing assembly is co-axially disposed within a processing chamber formed by the cylindrically-shaped member and wherein the processing assembly includes a plate member disposed for rotation in a plane perpendicular to the axis of the processing chamber and having a pentaprism and a fluorescence light sensor positioned proximate a contact point of the interrogating light beam with the storage film and further including converting electronics for the thus generated fluorescence light wherein after interrogation, the storage film is immediately restored in the same apparatus for subsequent reuse.

4 Claims, 5 Drawing Sheets

APPARATUS AND PROCESS FOR RETRIEVING INFORMATION PROJECTED IMAGE-WISE ON A REUSABLE STORAGE FILM AND ERASING AND RESTORING THE STORAGE FILM FOR SUBSEQUENT REUSE

RELATED APPLICATIONS

This application claims the benefit of provisional application Ser. No. 60/725,984, filed Oct. 13, 2005.

BACKGROUND OF THE INVENTION

1. Field of the Invention

The present invention relates to radiographic imaging, and more particularly to an improved apparatus and process for digitally retrieving information projected onto a reusable radiographic film and for erasing and restoring the radiographic film immediately after retrieval and in the same assembly.

2. Description of the Prior Art

Traditional x-ray imaging systems using silver-based films are being replaced by radiographic imaging systems using photo-stimulable phosphor imaging films or substrates eliminating the need for physical storage of the imaged film since digital retrieval of the image information includes input and computer storage permitting viewing of such information on a viewer, such as CRT tube assembly. Additionally, such computer stored image information permits facile electronic transmission to any preselect location obviating physical transfer of the thus formed image on the imaging film.

In U.S. Pat. No. 5,874,744 to Goodman, et al., assigned to the same assignee as the present invention, there is disclosed a process and apparatus for processing radiographic information from an anisotropic storage phosphor screen including an opto-electro-mechanical assembly to achieve faster scan of an interrogating beam and including detector and computer assembly, herein incorporated by reference.

In U.S. Pat. No. 6,599,014 to Thoms, there is disclosed an assembly for reading flexible storage films wherein the flexible storage film having image-wise projected information is positioned on a cylindrically-shaped surface and is caused to be linearly moved there over while being interrogated or scanned via a slot by a light beam generated in a helical line in a continuous manner from a point disposed at the axis of the cylindrically-shaped surface. The output fluorescence light or signal generated at the actual point the light beam intersects the storage film is received by a large diameter photomultiplier tube disposed proximate the slot. Such output signal is recorded together with positioning encoders to obtain an electrical image of the thus stored x-ray image on the storage foil. The configuration of the photomultiplier and the distance there from to the interpreting electronics results in a signal/noise ratio which while acceptable if advantageously decreased would provide more efficacious end result.

As used herein, the term "reusable storage film" is a flexible substrate formed with a layer of a photo-stimulable phosphors which is capable of imaging with ionizing radiation or x-rays which after imaging may be interrogated or scanned with a source of light energy to produce photo-stimulated luminescence information capable of being digitally read and stored.

OBJECTS OF THE INVENTION

An object of the present invention is to provide an improved apparatus and process for interrogating and interpreting an image on a reusable storage film moving past an accessible slot of an interrogating light beam and thereafter immediately restoring the storage film for reuse.

A further object of the present invention is to provide for an improved apparatus and process for interrogating and interpreting an image on a reusable storage film moving past an accessible slot of an interrogating light beam, the apparatus having incorporated therein a light cavity and a source of illumination for erasing the image from the storage film subsequent to the storage film being interrogated by a light beam to energize the image and store same.

A still further object of the present invention is to provide for a novel apparatus and process for interrogating and interpreting an image on a reusable storage film moving past an accessible slot of an interrogating light beam wherein the belt and roller assembly of the apparatus is of an extended length so as to engage the storage film from its insertion into the apparatus to a point subsequent to the erasing light cavity.

A still further object of the present invention is to provide for an improved apparatus and process for interrogating and interpreting an image on a reusable storage film moving past an accessible slot of an interrogating light beam wherein an erasing light cavity completely removes the stored image from the storage film permitting the immediate reuse of the storage film.

SUMMARY OF THE INVENTION

These and other objects of the present invention are achieved by an apparatus and process for evaluating an image-wise exposed storage film positioned about a cylindrically-shaped member and linearly passed a cylindrically-shaped slot for interrogation by a light beam wherein a processing assembly is co-axially disposed within a processing chamber formed by the cylindrically-shaped member and wherein the processing assembly includes a plate member disposed for rotation in a plane perpendicular to the axis of the processing chamber and having a pentaprism and a fluorescence light sensor positioned proximate a contact point of the interrogating light beam with the storage film and further including converting electronics for the thus generated fluorescence light wherein after interrogation, the storage film is immediately restored in the same apparatus for subsequent reuse.

BRIEF DESCRIPTION OF THE DRAWINGS

Further objects and advantages of the present invention will become more readily apparent by reference to the following detailed description thereof when taken with the accompanying drawings wherein like numerals designate like parts throughout and wherein.

DETAILED DESCRIPTION OF THE INVENTION

Figure 1:
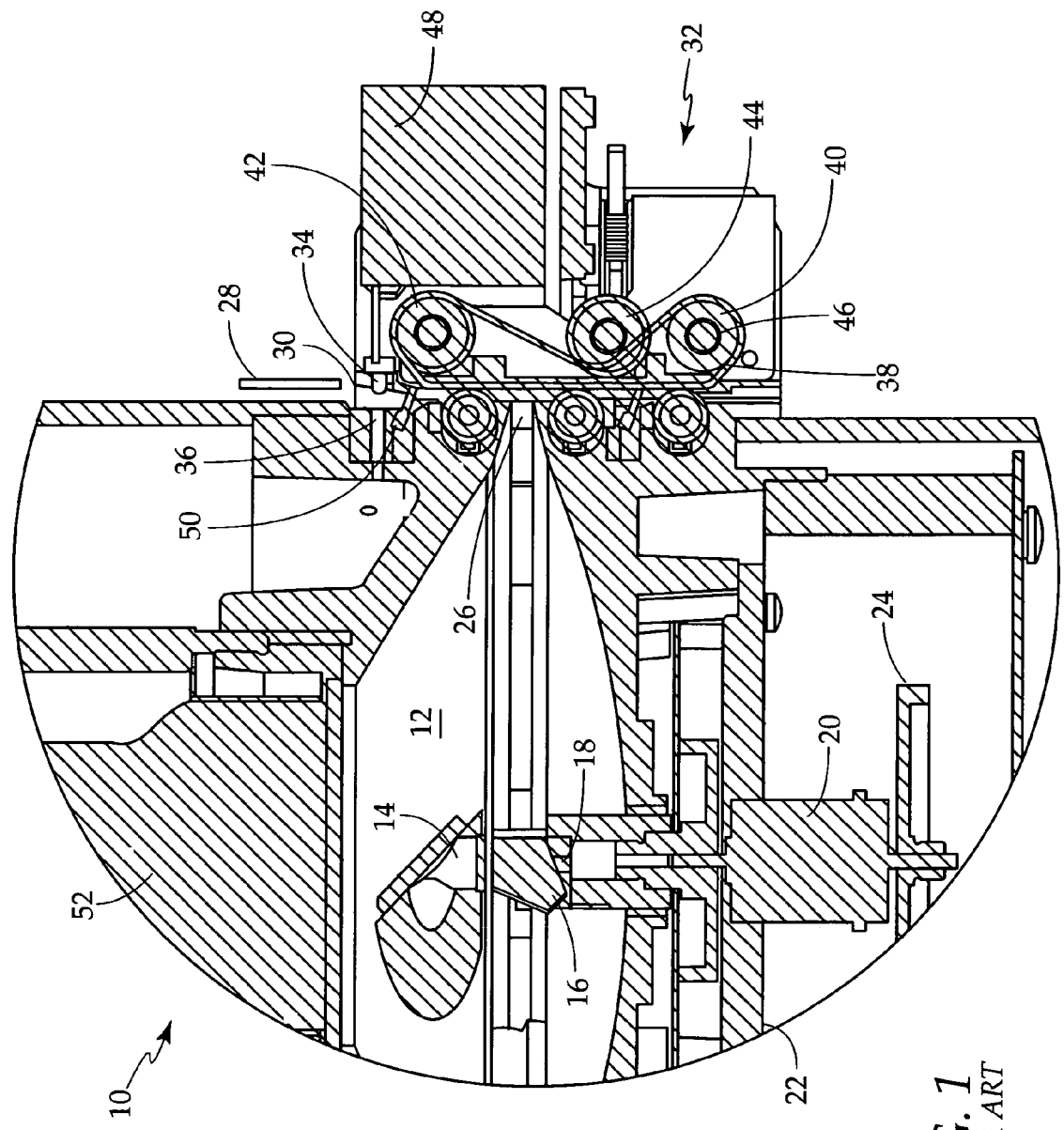
FIG. 1 is a partial cross-sectional view of the optical cavity and transport mechanism of a scanner of the prior art.

FIG. 1 is a partial cross-sectional view of the optical cavity 12 of a scanning mechanism 10 as presently exists in the prior art. Within the optical cavity 12, there is positioned a laser tube assembly 14 which transmits a light source to a pentaprism 16 centrally mounted within the optical cavity 12 on a shaft 18 secured to a pentaprism motor 20. Also mounted on shaft 18 are a pair of fly wheels 22 and 24. The light source from the laser tube assembly 14 is redirected as a light beam by the pentaprism 16, to a scanning slit 26. It is passed this scanning slit 26 that a photo-stimulable phosphor imaging plate 28 is passed having a latent image thereon.

The photo-stimulable phosphor imaging plate 28 is inserted into a slot 30 where it is engaged by a transport mechanism 32. The scanner detects the presence of a photo-stimulable phosphor imaging plate 28 by an LED emitter 34 and associated fiber optic plate 36 to indicate to the scanning mechanism that the imaging plate 28 is positioned for reading. A transport frame, generally indicated as 38, is comprised of a driver roller 40, idler roller 42, and tension roller 44 initiate movement of a transport belt 46 by means of a transport motor 48 causing the photo-stimulable phosphor imaging plate 28 to pass through a set of light sealing brushes 50 and thence in front of the scanning slit 26 where the photo-stimulable phosphor imaging plate 28 is interrogated by the light beam. The latent image on the photo-stimulable phosphor imaging plate 28 is excited by the light beam and its contents collected by photomultiplier 52 and then stored in a CPU unit for viewing and archival purposes.

The photo-stimulable phosphor imaging plate 28 after having been read, is transported by means of the transport belt 46 and associated drive rollers, etc. from the scanning assembly 10. At this time, the photo-stimulable phosphor imaging plate 28 would require eraser or restoration to remove the latent image thereon so that the photo-stimulable phosphor imaging plate 28 could be reused. One manner of erasing the photo-stimulable phosphor imaging plate 28 is to expose the imaging plate 28 to a light source for a time sufficient to allow for erasure and subsequent restoration of the plate for reuse. See U.S. Pat. No. 6,778,776 assigned to the same Assignee as the present application for one manner of accomplishing restoration of such an imaging plate.

Figure 2:
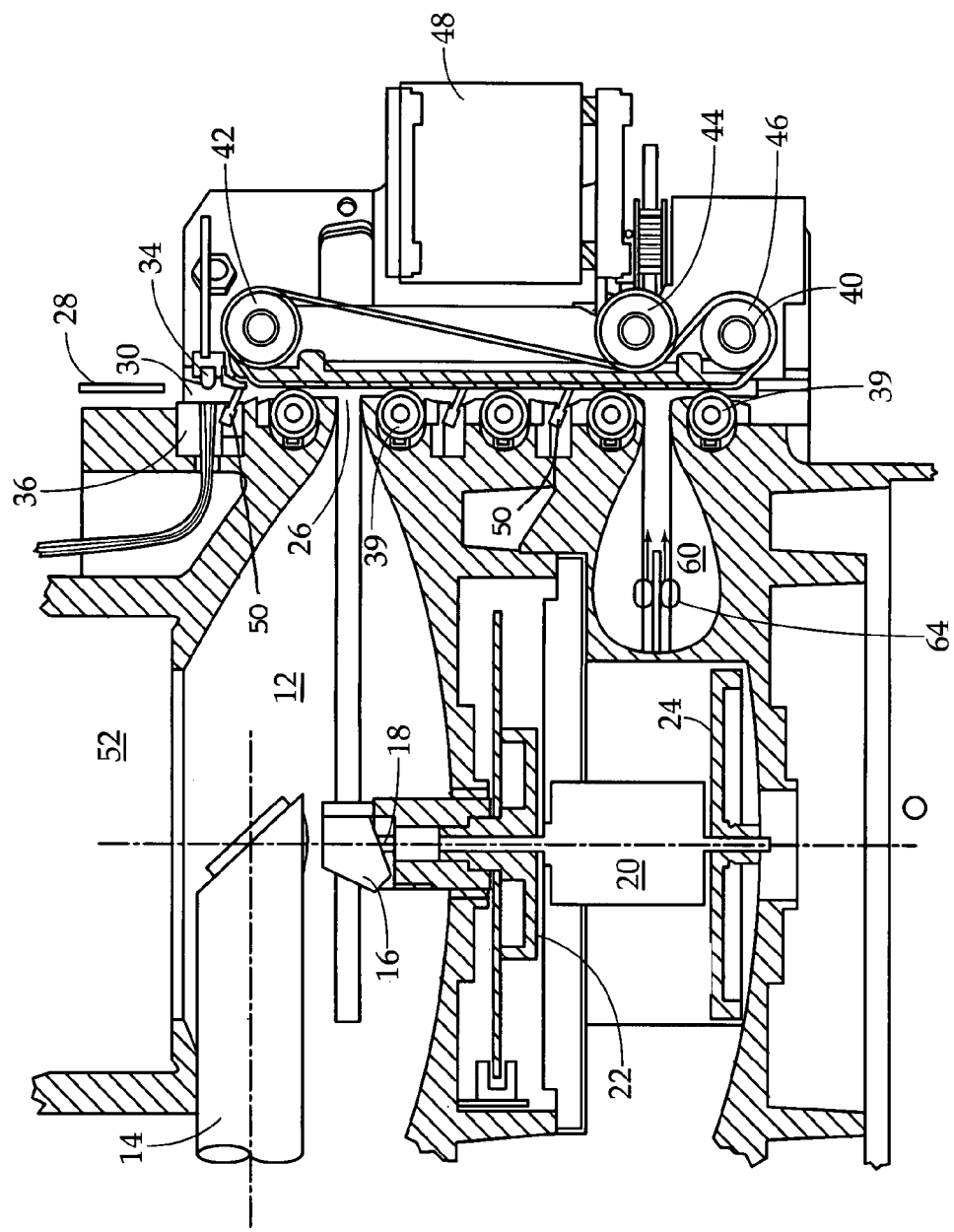
FIG. 2 is a partial cross-sectional view of the optical cavity and transport assembly of a scanner assembly of the present invention having restoration assembly.

Applicant's contribution to the scanning arts in this application is a scanner assembly 10 in which the photo-stimulable phosphor imaging plate 28 is erased or restored within the assembly after having been interrogated such that the photo-stimulable phosphor imaging plate 28 exiting the scanner assembly has had its latent image removed, is restored, and immediately ready for reuse. FIG. 2 is a partial cross-section of the scanning assembly 10 of the present invention.

The interior of the optical cavity 12 remains generally identical to the prior art thus described. However, the scanner assembly is provided with a light erasing cavity 60 positioned in the path of the photo-stimulable phosphor imaging plate 28, but subsequent to the scanning slit 26 where the latent image on the photo-stimulable phosphor imaging plate 28 is interrogated. In FIG. 2, the light erasing cavity 60 is positioned below the scanning slit 26 and in communication with the pathway of the photo-stimulable phosphor imaging plate 28 by means of an erasing slit 62. Positioned within the light erasing cavity 60 is a light source 64 in communication with a power source so as to direct a light beam through the erasing slit 62 and onto the photo-stimulable phosphor imaging plate 28 as it passes the erasing slit 62. In the configuration illustrated in FIG. 2, the light source is an array of multiple red/red orange LED's aimed radially outwardly so that the light emitted passes through the erasing slit 62. Additionally, the walls of the eraser cavity 60 may be mirrored to enhance the light emanating from eraser slit 62.

Since an additional process is now being performed in the scanner in addition to the interrogation process on the photo-stimulable phosphor imaging plate 28, the transport assembly 32 for transporting the photo-stimulable phosphor imaging plate must be extended. Whereas in the scanner assembly of the present art, the transport belt need only transport the photo-stimulable phosphor imaging plate 28 a distance sufficient for it to pass in front of the scanning slit 26 for interrogation and then to exit the scanner, the transport assembly for the present invention must be of longer configuration in order to transport the photo-stimulable phosphor imaging plate 28 past the erasing slit 62. In the configuration illustrated in FIG. 2, the number of plate pressure rollers 39 is increased to accommodate the additional distance and the transport belt 46 is also extended.

Figure 3:
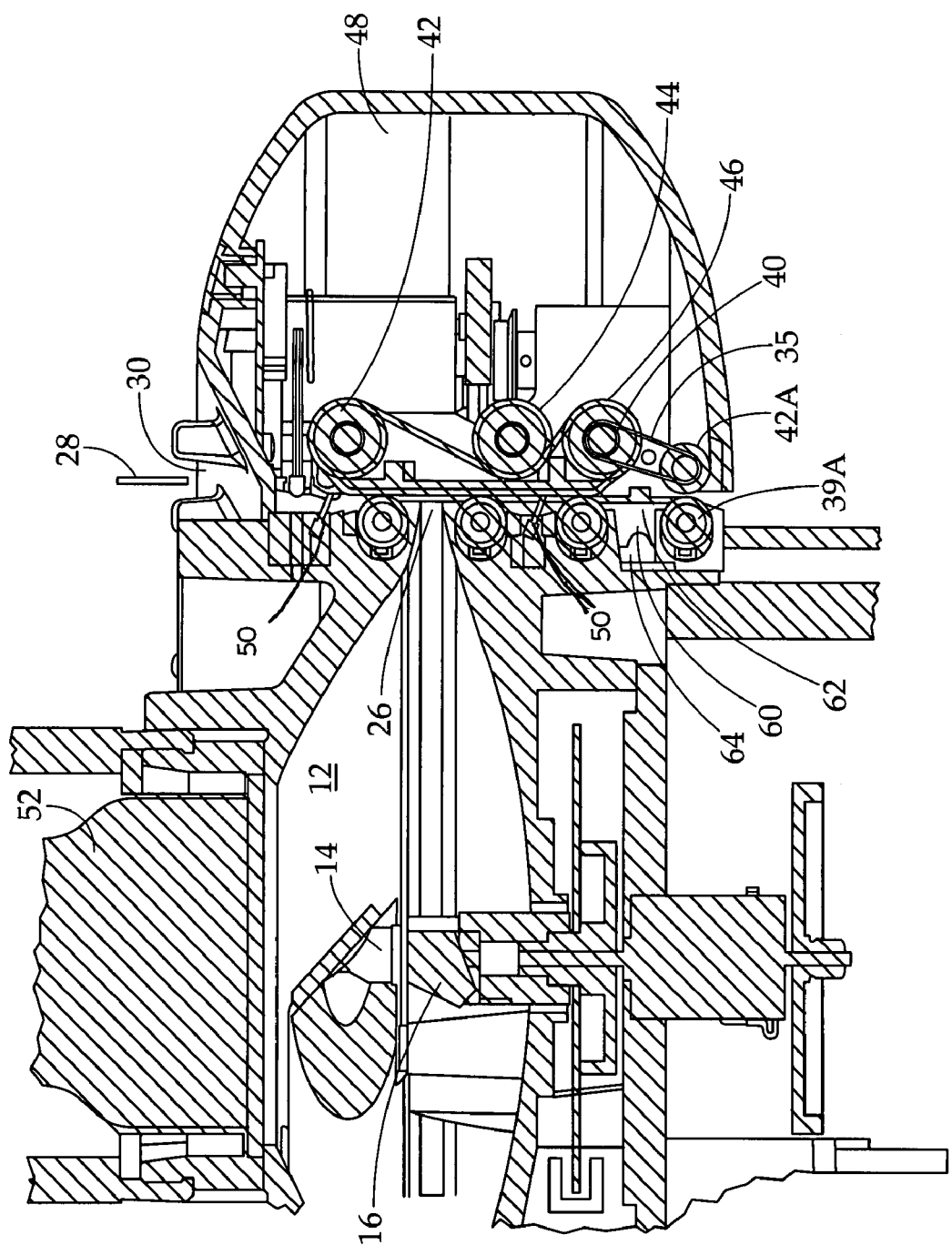
FIG. 3 is a partial cross sectional view of the optical cavity illustrating a second embodiment of the transport assembly in conjunction with the restoration assembly.

FIG. 3 is a cross sectional view of the optical cavity and transporter means illustrating a second embodiment of the transporter means which does not require a reengineering of the transport means of the existing prior art in order to be able to transport the photo-stimulable phosphor imaging plate 28 past the eraser cavity 60. In this configuration, additional idler rollers 42A is in belt communication with the drive rollers 40 of the original transport assembly 32. Idler rollers 42A are positioned below the eraser cavity 60 and adjacent additional pressure plate rollers 39A. In this configuration, the original transport belt 46 would transport the photo-stimulable phosphor imaging plate 28 past the eraser cavity 60 and then the lower pressure plate roller 39 and the idler rollers 42A would engage the photo-stimulable phosphor imaging plate 28 and transport it out of the scanner assembly 10 or to a depository for reuse. This embodiment provides for more efficient use of the transport means of the prior art with minor reengineering. The relationship between the idler rollers 42A and the lower pressure plate rollers 39A is illustrated in FIG. 5.

Figure 4:
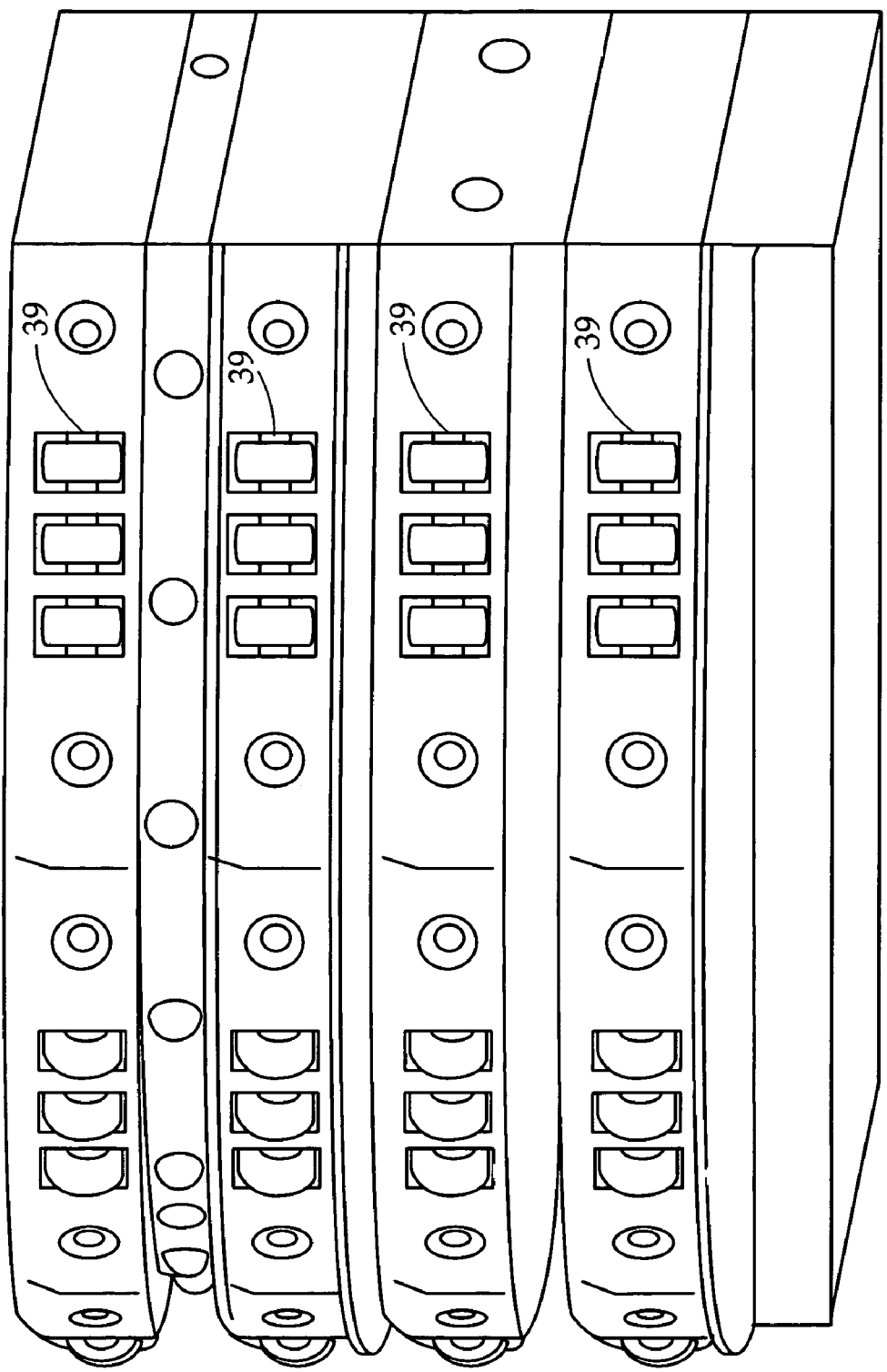
FIG. 4 is a front view of the scanner assembly of FIG. 3 with the transport assembly removed.

FIG. 4 is a side view of the scanning assembly 10 illustrating the plate pressure rollers 39A and their positioning within each vertical passageway in which the photo-stimulable phosphor imaging plate 28 is transported. There are multiple transport means 32 associated with a scanner to accommodate multiple sized imaging plates hence there are multiple sets of plate pressure rollers. Still further reference can be had to provisional application 60/693,020 of Applicant's directed to a belt and roller drive for the transport of an imaging plate within an opto-electrical mechanical scanning assembly.

Figure 5:
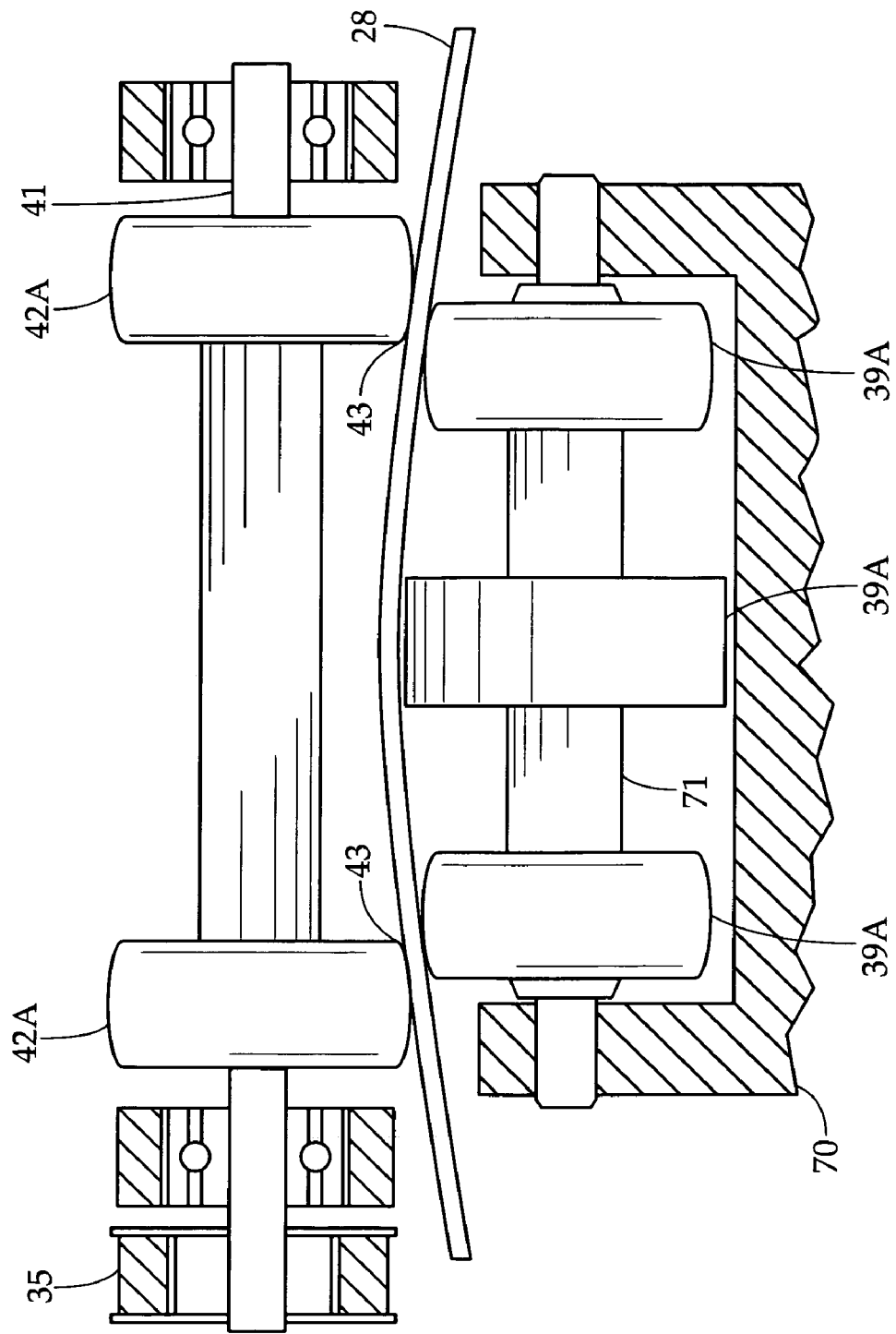
FIG. 5 is a partial top view of the relationship between the transport assembly and plate pressure rollers of the transport assembly illustrated in FIG. 3.

FIG. 5 illustrates the relationship between lower pressure plate rollers 39A and idler rollers 42A of the FIG. 3 embodiment. A bracket 70 is attached to the optical scanner on which the lower plate pressure rollers 39A are mounted. Lower plate pressure rollers 39A are mounted on bearings on an idler axle 71 which is spring loaded with the center plate pressure roller being of slightly larger circumference than those on either side. The lower idler rollers 42A are in communication with the drive roller 40 by means of a timing belt 35. In the configuration illustrated in FIG. 5, the idler rollers 42A are fixedly mounted on shaft 41 with the circumferential periphery 43 in tangential contact with the outer plate pressure rollers 39A such that the imaging plate passes thereby in an arcuate relationship.

The transport mechanism embodiments of FIGS. 2 and 3 can positively engage the photo-stimulable phosphor imaging plate 28 from its insertion point 30 to its ejection point and allows for an erasing light cavity 60 to be positioned in the scanner assembly 10 subsequent or downstream from the scanning slit 26 with the erasing light cavity having an erasure slit 62 and light source 64 which allows for the photo-stimulable phosphor imaging plate to be erased and restored and ready for reuse immediately after it has been interrogated and read. It will be recognized that many different light sources can be utilized to erase the photo-stimulable phosphor imaging plate and restore it for reuse. Applicant's use of an array of multiple red/red orange LED's is for explanatory purposes, but this wave length is well suited for such erasing and for not interfering with the data acquisition as this wave length is filtered out by the blue filter on the photo-multiplier tube.

While the present invention has been described with respect to the exemplary embodiments thereof, it will be recognized by those of ordinary skill in the art that many modifications or changes can be achieved without departing from the spirit and scope of the invention. Therefore it is manifestly intended that the invention be limited only by the scope of the claims and the equivalence thereof.

What is claimed is:

1. An apparatus for processing an imaged storage film to retrieve information and to restore imaging capability thereof, which comprises:
   a scanning assembly having a cylindrically-shaped positioning surface including a light slot for a scanning light beam and an erasing slit for light from a light source, said scanning assembly including means for generating said scanning light beam to interrogate said imaged storage film to stimulate fluorescence light which is collected and stored as said retrieved information; and
   a transport assembly positioned on said scanning assembly including a drive roller, an idler roller and a transport belt coursed about said drive and idler rollers whereby activation of said drive roller causes said imaged storage film to transit said light slot to effect interrogation of said image storage film and thereafter said erasing slit to restore imaging capability of said thus interrogated imaged storage film.

2. The apparatus for processing an imaged storage film as defined in claim 1 wherein said light source for light directed towards said erasing slit is an incandescent light.

3. The apparatus for processing an imaged storage film as defined in claim 1 wherein said light source for light directed towards said erasing slit is a plurality of light emitting diodes aimed radially outwardly towards said erasing slit.

4. The apparatus for processing an imaged storage film as defined in claim 3 wherein said light emitting diodes comprise an array of red/red orange light emitting diodes.

* * * * *